United States Patent [19]

Yamamori

[11] Patent Number: 4,786,991
[45] Date of Patent: Nov. 22, 1988

[54] MAGNETIC RECORDING/REPRODUCTION APPARATUS

[75] Inventor: Kazuyoshi Yamamori, Yokohama, Japan

[73] Assignee: Kabushiki Kaisha Toshiba, Kawasaki, Japan

[21] Appl. No.: 27,124

[22] Filed: Mar. 16, 1987

Related U.S. Application Data

[63] Continuation of Ser. No. 757,286, Jul. 22, 1985, abandoned.

[30] Foreign Application Priority Data

Jul. 31, 1984 [JP] Japan .................................. 59-160515

[51] Int. Cl.$^4$ .................................................. G11B 5/03
[52] U.S. Cl. ......................................................... 360/66
[58] Field of Search ................................... 360/66, 108

[56] References Cited

U.S. PATENT DOCUMENTS

| | | | |
|---|---|---|---|
| 3,070,670 | 12/1962 | Eldridge et al. | 360/66 |
| 3,514,851 | 6/1970 | Perkins et al. | 360/118 |
| 3,838,446 | 9/1974 | Otsuka et al. | 360/66 |
| 3,879,754 | 4/1975 | Ballinger | 360/123 |
| 3,900,894 | 8/1975 | Aziz | 360/108 |
| 4,205,356 | 5/1980 | Tanaka et al. | 360/66 |
| 4,290,088 | 9/1981 | Beecroft | 360/66 |
| 4,423,450 | 12/1983 | Hamilton | 360/111 |
| 4,455,582 | 6/1984 | Yanagida et al. | 360/66 |
| 4,622,614 | 11/1986 | Yamasirz et al. | 360/66 |

OTHER PUBLICATIONS

B. J. Langland et al. "Recording on Perpendicular Anisotropy Media with Ring Heads" *IEEE Transactions on magnetics*, vol. MAG-17, No. 6, Nov. 1981.

*Primary Examiner*—Vincent P. Canney
*Attorney, Agent, or Firm*—Oblon, Fisher, Spivak, McClelland, & Maier

[57] ABSTRACT

A magnetic recording/reproducing apparatus for recording data by using remanent magnetization perpendicular to a magnetic layer surface of a magnetic recording medium has an erase head for erasing the data from the recording medium in front of a recording head for recording the data on the recording medium.

4 Claims, 2 Drawing Sheets

MAGNETIC RECORDING/REPRODUCTION APPARATUS

This application is a continuation of application Ser. No. 757,286, filed July 22, 1985, now abandoned.

BACKGROUND OF THE INVENTION

The present invention relates to an apparatus for recording/reproducing information using a magnetic recording medium such as a flexible disk, i.e., a floppy disk and, more particularly, to an apparatus for recording/reproducing information by mainly utilizing remanent magnetization perpendicular to a magnetic layer of the recording medium.

Various magnetic recording/reproducing apparatuses are known to record/reproduce information using a magnetic recording medium such as a floppy disk.

In a conventional magnetic recording/reproducing apparatus for recording digital data, when data recorded in the recording medium is updated, i.e., when old data is replaced with new data, the new data is written over the old data. In this case, the old data in the recording medium need not be pre-erased, and new data is recorded at the same position as that of the old data for the following reason.

Digital recording is basically saturation recording. In the conventional apparatus, magnetization is directed along the longitudinal direction, and internal energy is maximum near a magnetization transition point, i.e., a data recording point. Magnetization is most unstable at the transition point. Therefore, the old data does not substantially influence the new data when the new data is written over the old data.

Unlike digital recording, nonmodulated analog recording, normally used in audio or video data recording, is unsaturated recording. Old data must be erased before analog recording is performed.

In a magnetic recording/reproducing apparatus such as a floppy disk used in computers or equipment associated with computers, only apparatuses employing the above-mentioned data overwrite system are in practical use.

A perpendicular magnetic recording system recently developed by Professor Iwasaki at Tohoku University is preferred to perform high-density recording, and further studies are being made for practical applications.

The magnetic recording medium generally used for perpendicular magnetic recording include a particulate medium using barium ferrite and a thin film medium using a thin Co-Cr alloy film. Theory of perpendicular magnetic recording and high-density recording performance obtained therewith have been reported at various meetings and the like, and a detailed description thereof will be omitted. To achieve quality perpendicular magnetic recording problems inherent therein which are unlike those in conventional in-plane magnetic recording systems, i.e., longitudinal magnetic recording systems must be resolved.

The recording problems inherent in perpendicular magnetization have been determined by the present inventor as follows.

FIG. 1 shows the measured data when overwriting is performed in various magnetic recording media using an Mn-Zn ferrite head having an effective gap length of 0.4 μm. For the measurements, the signals were written at a recording density of 10 kBPI, with other signal being then written at a recording density of 20 kBPI, and the OWM (overwrite modulation) represented by an attenuation component of the 10-kBPI signals being plotted. Referring to FIG. 1, the OWM values are plotted along the ordinate, and the current values are plotted along the abscissa.

FIG. 1 shows the characteristic L1 of the first medium, a particulate in-plane orientation medium using $Co-\gamma-Fe_2O_3$ as a magnetic layer material, characteristic L2 of the second medium, a barium ferrite particulate medium of a magnetic layer material, with the perpendicular orientation given by way of a mechanical force, applied upon the coating of the magnetic powder, and characteristic L3 of the third medium, a barium ferrite particulate medium of a magnetic layer material, with perpendicular orientation given by way of a mechanical force and a perpendicular magnetic field of 6 kOe, which are applied when the magnetic powder is coated on a base. The coercive force Hc of the first medium is 600 Oe, and the coercive force Hc of the second and third media is 700 Oe. The thickness of a magnetic layer of each of the first to third magnetic layers is 2 μm.

Referring now to FIG. 1, the overwrite characteristics L2 and L3, with the recording media of magnetization perpendicular to the magnetic layer, surface are degraded as compared with the overwrite characteristics L1 of the in-plane orientation medium. The OWM must generally be designed to be smaller than about −26 to −30 dB. In a head-medium system obtained by the characteristics shown in FIG. 1, an optimal recording current, (a current corresponding to the maximum output) of the input/output characteristics, between 7 and 10 mA 0-p (zero-to-peak). Within this range, the first medium of in-plane orientation has a good overwrite characteristic as is shown by L1. However, the third medium which is oriented more perpendicularly has a poor overwrite characteristic shown as L3. The second medium which is weakly orientated perpendicularly has better overwrite characteistics, shown as L2, than those of the third medium. However, this second medium cannot be utilized practically due to considerations of compatibility between different recording/reproducing apparatuses.

Perpendicular recording is suitable for high-density recording mainly because a demagnetizing field in the medium, and more particularly to a demagnetizing field near a magnetization transition point corresponding to the data recording point is substantially zero, as is well known. This condition indicates that internal energy of the medium is very low and stable. As described above, since the magnetization transition point is unstable in an in-plane recording system, data updating can be performed by an overwrite operation. However, in perpendicular recording, a high amount of energy is required to erase the recorded data. Therefore, the old data (i.e., previously recorded data) cannot be sufficiently erased by an overwrite operation during perpendicular recording.

It is not impossible to improve the overwrite characteristics in perpendicular recording by increasing the gap length of a magnetic recording head or forming a very thin magnetic layer on the medium. However, as perpendicular recording aims at high-density recording, short-wavelength recording is more desirable. In order to perform short-wavelength recording, the gap length of the recording head cannot be increased. In addition, it is very difficult to form a very thin magnetic layer. With a thin film type recording medium, the thickness of the magnetic layer can be decreased, but in this case other characteristics of the media may be effected adversly. The possibility of decreasing the coercive force Hc so as to improve the overwrite characteristics has also been considered. However, when the coercive force Hc is small, both the old and the new data signals deeply permeate the medium, and the final OWM characteristics cannot be significantly improved. As a result, characteristics such as reproduction output and recording density are impaired.

SUMMARY OF THE INVENTION

It is an object of the present invention to provide a magnetic recording/reproducing apparatus which effectively resolves basic problems in a magnetic recording/reproducing apparatus using the remanent magnetization perpendicular to a magnetic layer surface of a magnetic recording medium in such a manner as to perform recording/reproduction, and which effectively prevents old data from being mixed as noise with new data during data updating.

In an apparatus for recording/reproducing data by using remanent magnetization perpendicular to a magnetic layer surface of a magnetic recording medium, an erase head is arranged at a position (i.e., a position opposite to the travel direction of the magnetic recording medium with respect to the recording/reproducing head) in front of the recording or recording/reproducing head with respect to the magnetic recording medium. The recording head or the recording/reproducing head and the erase head may be integrally or separately arranged.

According to the present invention, old data already recorded in a region subjected to recording of new data is erased prior to such recording. For this reason, the old data will not be mixed as noise with the new data, thereby allowing a high-quality recording. Since the old data is almost completely erased by the erase head and new data is recorded, good recording can be performed in perpendicular recording irrespective of overwrite characteristics.

In an apparatus for recording/reproducing data by partially using remanent magnetization perpendicular to the magnetic layer surface, unlike complete perpendicular recording, the overwrite characteristics are degraded as compared with those in in-plane recording. The present invention can also be effectively used in such an apparatus.

In digital recording, a known tunnel erase head is arranged behind the recording head so as to correspond to two sides of the recording track. This erase head is often used in an in-plane recording system such as a conventional floppy disk drive. The tunnel erase head erases data by trimming the two sides of the recording track after recording, thereby preventing the remanent component of the old data and recording data of the adjacent tracks from being mixed with the new data of the corresponding track. In this case, since an overwrite operation is normally performed to record data, old data is mixed with new data in perpendicular recording. The present invention can also be effectively used in such an apparatus. The use of the tunnel erase head is accompanied by the problem of a displacement between the two erase gaps of the tunnel erase head and the track of a disk-shaped recording medium, e.g., a floppy disk. The displacement is great particularly when an inner track is involved. When one of these erase gaps overlaps too large a lateral edge portion of the track, it erases too much of the data recorded on that track. Conversely, if it overlaps too small a lateral edge portion of a track, it will fail to erase a sufficient portion of the data. The unerased data may result in an erroneous reproduction of the new data to be recorded on the track. Such an excessive or insufficient erasure of data from the inner track does not occur in the apparatus of the present invention since the erase head first erases data recorded on the entire track, with one erase gap, and a recording head then records data in the region sufficiently narrower than the erased track. Hence, there is no risk that any old data remains on a lateral edge portion of the track. The present invention is therefore suitably applied to a recording/reproducing apparatus for a disk-like magnetic recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 2:
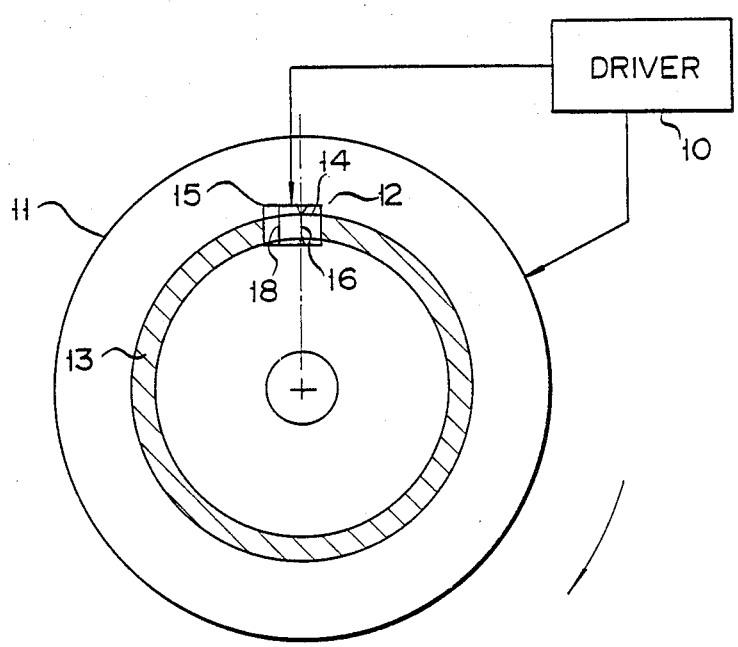
FIG. 2 is a representation showing a schematic arrangement of a magnetic disk drive according to an embodiment of the present invention.

FIG. 2 shows a schematic arrangement of a magnetic recording/reproducing apparatus according to an embodiment of the present invention. The apparatus comprises a floppy disk drive using a disk-like flexible magnetic recording medium.

A disk 11 comprises a disk-like flexible sheet of a magnetic recording medium. In the disk 11, remanent magnetization is mostly perpendicular to the magnetic surface layer. More particularly, in the disk 11, barium ferrite is coated as a magnetic layer on a sheet-like base of a polymer such as polyester, and an axis of easy magnetization of the magnetic layer is perpendicular to the magnetic surface layer.

A magnetic head unit 12 is arranged to oppose the magnetic layer of the disk 11.

At least one of a disk such as disk 11 and the magnetic head unit 12 are driven by a driver 10 to cause relative movement therebetween. The driver 10 causes a disk 11 to rotate in the direction indicated by the arrow to cause relative movement of the unit 12 along concentric recording tracks of the disk 11 and at the same time causes the unit 12 to radially move along the disk 11, thereby moving the unit 12 to a desired track among the plurality of concentric recording tracks. FIG. 2 shows a given recording track 13 among the plurality of recording tracks.

The unit 12 comprises a recording/reproducing head 14 and an erase head 15 arranged to be parallel to each other. The head 15 is located in front of the head 14 on the track 13. The head 14 is located in front of the head 15 along the rotational direction of the disk 11.

FIG. 2 shows a state wherein the unit 12 is viewed through the disk 11 from its lower surface for illustrative convenience.

Figure 3A:
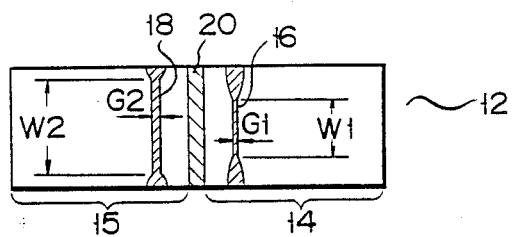
FIGS. 3A and 3B are respectively a front view and a side view of a magnetic head used in the magnetic disk drive of FIG. 2.
Figure 3B:
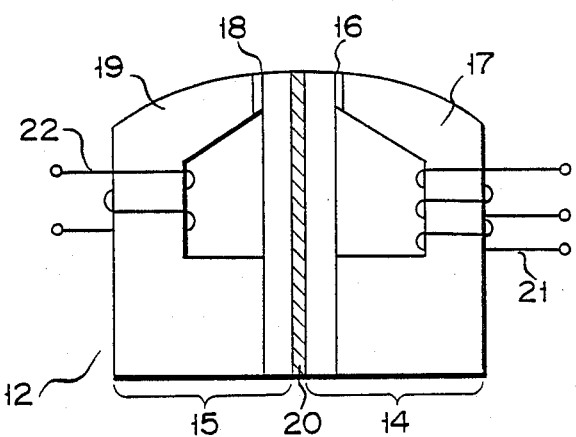

FIGS. 3A and 3B show a detailed structure of the unit 12.

As described above, the unit 12 comprises the heads 14 and 15. A magnetic core 17 having a recording/reproducing gap 16 is integrally bonded with a magnetic core 19 having an erase gap 18 through a spacer 20 of a nonmagnetic material. A recording/reproducing winding 21 is wound around the core 17 constituting the head 14. An erase winding 22 is wound around the core 19 constituting the erase head 15. During recording, a recording current flows through the winding 21, and a DC or AC erase current flows through the winding 22. A reproduction output is extracted from the winding 21 of the head 14 during reproduction.

A track width W2 (i.e., the length of the gap 18 along the track width) is set to be larger than a track width W1 (i.e., the length of the gap 16 along the track width). The gap length G2 (along the track) of the gap 18 is sufficiently larger than the gap length G1 (along the track) of the gap 16.

The condition $W2 \geq W1$ is set to prevent an increase in OWM due to overwritten portions at the two sides of a track.

Figure 4:
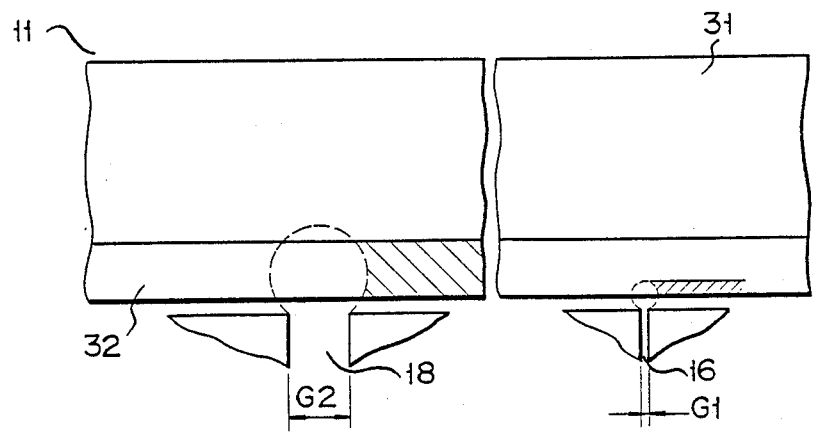
FIG. 4 is a representation for explaining the effect of the magnetic disk drive shown in FIG. 2.

The condition $G2 > G1$ is set to obtain a sufficient erase effect. The head 15 does not have any restriction concerning recording/reproduction, therefore, the gap length G2 can be sufficiently increased. As shown in FIG. 4, data is erased from or recorded in a magnetic layer 32 formed on a base 31 of the disk 11. Since the length G2 of the gap 18 is sufficiently larger than the length G1 of the gap 16, data can be erased deeper within the magnetic layer, and thus the data recorded by the gap 16 can be completely erased. If $G2 < G1$, a signal flux detected by the gap 18 is often mixed in the core 17 of the head 14 to cause crosstalk. However, since $G2 >> G1$, the data recorded by the gap 16 can hardly be detected by the erase gap 18 due to gap loss. For this reason, any crosstalk can be sufficiently suppressed.

In the conventional apparatus using the tunnel erase head, when the radius of the recording track on the disk is decreased, that is, when the radius of the curvature of the recording track is increased, a tracking error occurs. That is an undesirable descrepency between the area recorded by the recording head (gap) and the area erased by the tunnel erase head. However, in the apparatus of the present invention, the above problem does not occur as will be described in detail below.

According to the embodiment shown in FIG. 2, even if the head 14 is integrally formed with the head 15, a physical distance exists between the gaps 16 and 18 which cannot be decreased beyond a given degree. In addition, in order to provide stable recording/reproduction and compatibility between various apparatuses, the recording/reproducing gap must be arranged along a line passing through the center of the disk so as to obtain a given or set azimuth with respect to the recording track. Recording media for magnetic disk drives such as floppy disk drives have been recently decreased in size. For example, the disk size (diameter) was conventionally 8" but has now decreased to 5.25" and 3.5". A 2" disk is now commercially available. When a small-diameter disk is subjected to recording, the width of an individual track is decreased. When the recording track has a small diameter and a large radius of curvature, a error occurs in the positioning between the erase head and the recording track recorded by the recording head and this error is increased. In the case of a conventional tunnel erase head, the recording head is then located in front of the tunnel erase head and the erase regions, excluding the central portion, are located at the two sides of the recording track. When positional errors are increased, the erase region is increased to largely enter into the recording track, and the recorded data is excessively erased, resulting in a decrease in the reproduction output. In addition, when such a positional error occurs, the erase regions are separated from the two sides of the new recording track. When old data is left in portions between the erase regions and the two sides of the new recording track (such an error cannot always be prevented), the old data is mixed in the reproduced signal of the new data, resulting in great disadvantage. However, according to this embodiment, a region for recording new data is erased by the erase head, and subsequently the new data is then recorded in this region. When the width of the erase region to be erased by the erase head is set to be larger than the width of the recording track recorded by the recording head in consideration of interference between adjacent tracks and positional errors, old data will not adversely influence the new data when it is reproduced.

Figure 1:
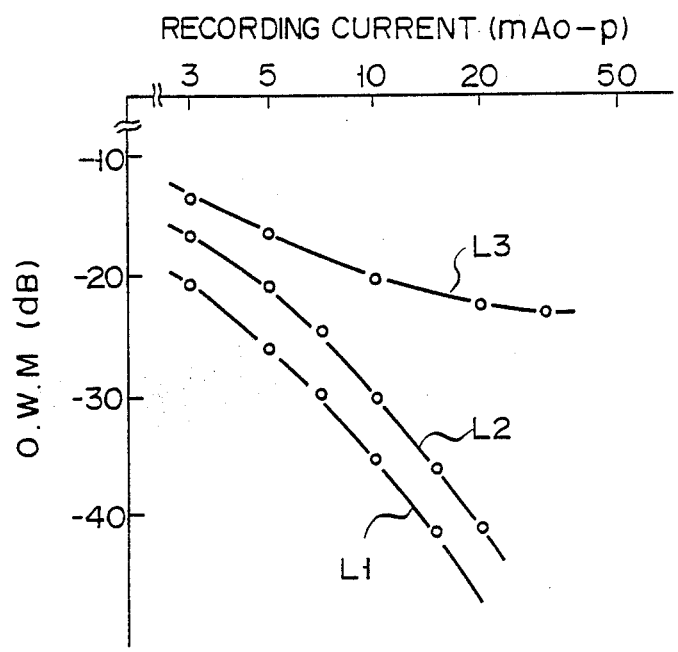
FIG. 1 is a graph showing OWM differences between perpendicular magnetic recording and in-plane magnetic recording.

In the apparatus of FIG. 2, digital recording/reproduction was performed using a head having an erase core with a gap length of 1.5 to 2 $\mu$m and a magnetic recording medium having the characteristics L2 and L3 of FIG. 1. The remanent level of the old data in the reproduced output in any condition was confirmed to be suppressed to $-50$ dB or less.

Since the erase head is located in front of the recording head or the recording/reproducing head, the recording head records data in the track along which the erase head has already passed. Therefore, a time lag between recording and erasure occurs. If this time lag is not desired, the erase head must be operated prior to the operation of the recording head. For this purpose, in general, the recording operation of the recording head is delayed; with the erase operation of the erase head being performed prior to the recording operation.

As described above according to this embodiment, the heads 15 and 14 need not be integrally formed but can be separately arranged to obtain the same result as in the embodiment. Recording and reproduction need not be performed by a single recording/reproducing head but can be performed by separate recording and reproducing heads.

The present invention can also be applied to a magnetic recording/reproducing apparatus using a magnetic recording medium such as a magnetic tape, in addition to a magnetic disk apparatus such as a floppy disk or a hard disk.

The present invention can be effectively applied to a particulate magnetic recording medium having a magnetic layer of barium ferrite. However, another magnetic recording medium may be used if it has a magnetic layer of perpendicular magnetization. For example, the present invention can be used with a thin film type magnetic recording medium having a magnetic layer of Co-Cr alloy.

Furthermore, the present invention can also be applied to analog recording as well as to digital recording.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording/reproducing apparatus comprising:
    a disk-like perpendicular magnetic recording medium having a magnetic layer for recording digital data by remanent magnetization perpendicular to said magnetic layer;
    recording head means including a recording gap which at least records data in said recording medium by changing the direction of magnetic field applied to the recording medium, in response to signals containing digital data to be recorded;
    erase head means formed integrally with said recording head means, including an erase gap greater than 1.5 $\mu$m arranged in an advanced position relative to said recording gap of said recording medium prior to the recording of new data by said recording head means, the track width determined by said erase gap being greater than that determined by said recording gap, to thereby sufficiently remove all remanent magnetization with a range wider than the recording track, and said erase gap having a gap length greater than that of said recording gap, to thereby deeply remove all remanent magnetization of the old data when driven by a current having an overwrite modulation below $-26$ dB; and
    driving means for driving at least one of said head means and said recording medium, to cause relative movement between said head means and said recording medium.

2. A magnetic recording/reproducing apparatus according to claim 1, wherein said erase head means erases data by means of an alternating current.

3. A magnetic recording/reproducing apparatus according to claim 1, further comprising reproducing head means for reproducing the data recorded in said recording medium.

4. A magnetic recording/reproducing apparatus according to claim 1, wherein said recording head means comprises a recording/reproducing head for performing-recording and reproduction of the data with respect to said recording medium.

* * * * *